United States Patent

[11] 3,622,818

| [72] | Inventor | Jean Pol Payen<br>Grenoble, France |
|---|---|---|
| [21] | Appl. No. | 879,873 |
| [22] | Filed | Nov. 25, 1969 |
| [45] | Patented | Nov. 23, 1971 |
| [73] | Assignee | Merlin Gerin Societe Anonyme<br>Grenoble, France |
| [32] | Priorities | Dec. 20, 1968 |
| [33] | | France |
| [31] | | 179,774;<br>Dec. 20, 1968, France, No. 179,776 |

[54] LINEAR INDUCTION MOTOR WINDING
4 Claims, 11 Drawing Figs.

[52] U.S. Cl. .................................................... 310/13,
318/135
[51] Int. Cl. ...................................................... H02k 41/04
[50] Field of Search ......................................... 310/12–14,
198, 200, 202, 204; 318/121, 135

[56] References Cited
UNITED STATES PATENTS

| 1,889,940 | 12/1932 | Ziegler ......................... | 310/202 |
| 3,194,032 | 7/1965 | Von Brimer ................. | 310/268 UX |

FOREIGN PATENTS

| 1,175,487 | 12/1969 | Great Britain ................ | 310/13 |
| 889,420 | 2/1962 | Great Britain ................ | 310/13 |

Primary Examiner—D. F. Duggan
Attorney—Stevens, Davis, Miller & Mosher

ABSTRACT: Linear induction motor having a slotted magnetic field structure wound with a multiphase winding having legs which extend in the slots. The legs are disposed in at least two layers in the slots and interconnected by pairs in each layer whereby all slots contain the same number of layers. The magnetic field structure is subdivided into units of double-pole pitch length which are electrically independent and not cross-connected.

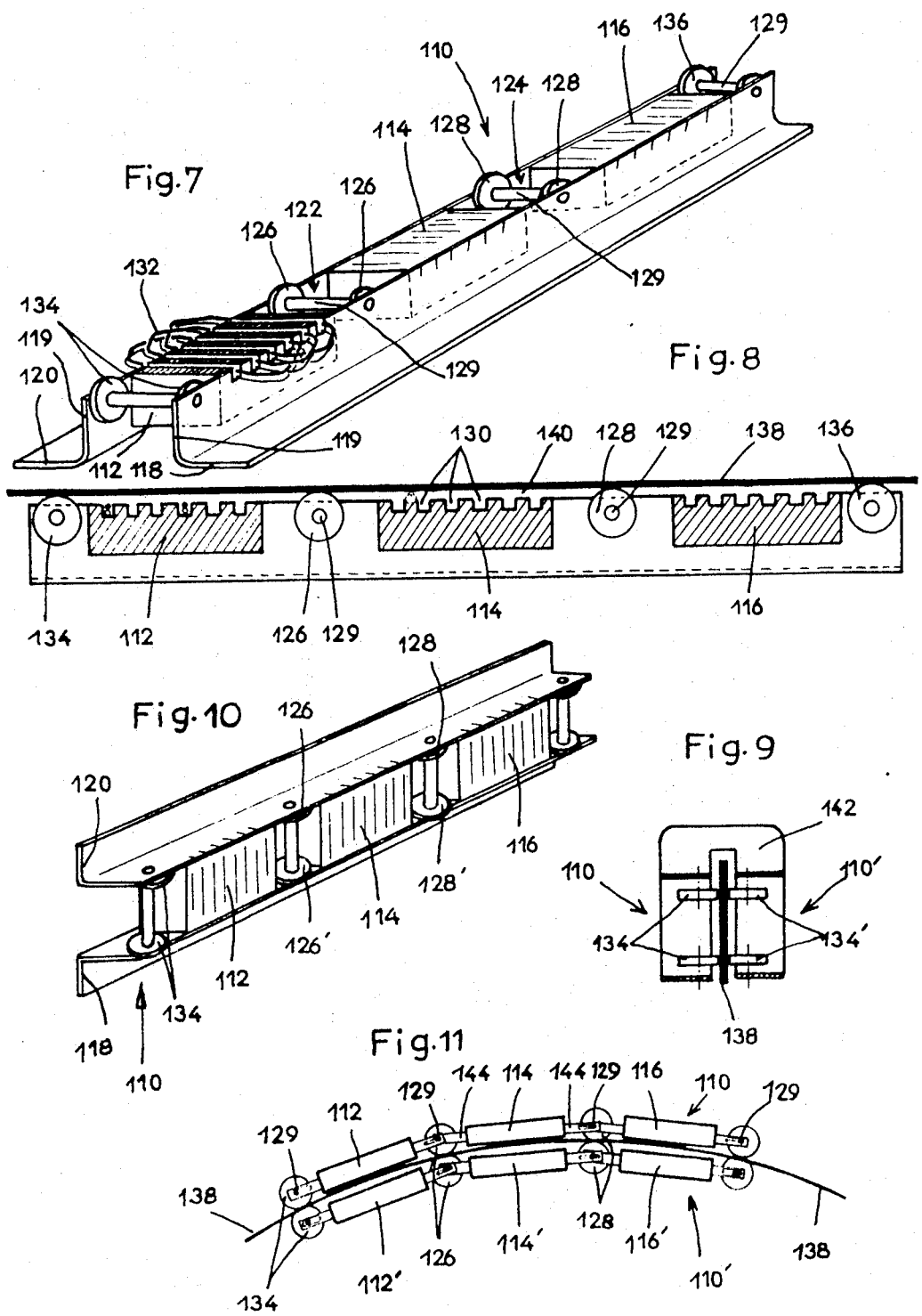

LINEAR INDUCTION MOTOR WINDING

This invention relates to improvements in a linear induction motor of the type comprising a slotted magnetic field structure through the slots of which is wound a multiphase winding consisting of a plurality of coils arranged in at least two superimposed layers.

In known winding arrangements, the two legs of each coil are in different ones of said layers with the result that the endmost slots of the field structure contain fewer winding layers (coil legs) than do the intermediate slots. According to this invention, on the other hand, the two legs of each coil are in the same layer and these legs are interconnected electrically in series by cross-connecting portions of the winding, which cross-connecting portions also are substantially in the same plane as the legs which they connect excepting for a very slight degree of bending which is necessary to avoid interference with the cross-connecting portions with all other coils which are in a common plane. It results, from this, that the respective coils may be preformed on a former and finally very easily fitted into place within the field structure slots.

One object of this invention, therefore, is the provision of a linear induction motor the winding coils of which may be preformed while another object is that of providing a linear motor whose field structure endmost slots have a number of winding legs equal to that of the other slots whereby the traveling magnetic field is uniform along the entire extent of the field structure.

Another object of the invention is realization of a winding arrangement wherein the cross-connectors are shortened relative to known arrangements and also wherein the coils of different phases are located within common slots, so as to realize a decrease in losses and an increase in the winding power factor.

Another object of the invention is the realization of a magnetic field structure the winding slots of which are of considerable depth and also wider than the intervening slot-defining shoulders.

It is a further object of this invention to realize a linear induction motor whose field structure is comprised of a plurality of electrically and magnetically independent units which are, however, structurally integrated with each other to form a unitary structure.

Other objects are those which are inherent in the invention as disclosed herein.

Said objects are generally realized through a winding arrangement wherein, inter alia, the cross-connectors connect only soil legs located in a common layer and which comprise part of a common double-pole pitch section. Further, the endmost slots of the structure contain the same number of coil legs as do any of the other slots of the structure. It results from the foregoing that a winding in accordance with this invention lends itself to the realization of magnetic field units of relatively short length, specifically, of a length equivalent to the double pole pitch of the winding.

A detailed description follows of various embodiments of field structure according to this invention, reference being made to the accompanying drawing, wherein:

FIG. 7 is a perspective view of a first embodiment of linear motor in accordance with the invention having a unitary magnetic field structure;

FIG. 8 is an elevation view of the motor of Fig. 7 in combination with a plate-shaped armature;

FIG. 9 is an end view of a second embodiment of linear motor according to the invention;

FIG. 10 is a perspective view of a part of the magnetic field structure of the motor of Fig. 9;

FIG. 11 is a plan view of an embodiment of the invention having articulated field units.

Figure 1:
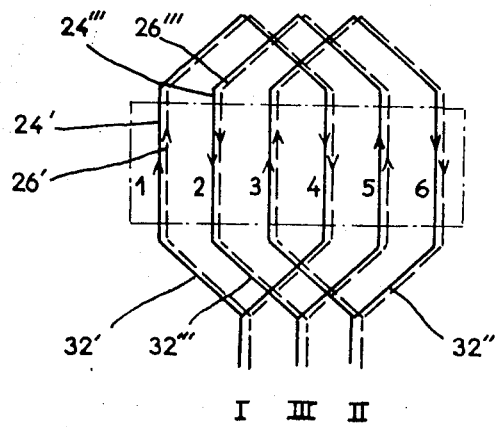
FIG. 1 is a schematic view of a section of a three-phase field structure having one slot per phase and per pole, in accordance with the invention.
Figure 2:
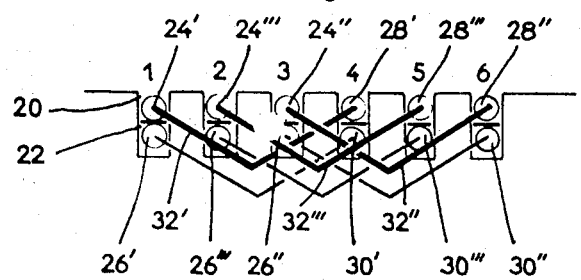
FIG. 2 is a front view of the winding according to Fig. 1.
Figure 3:
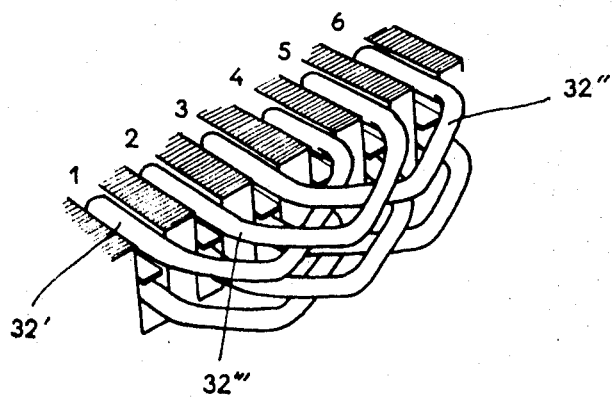
FIG. 3 shows in perspective the cross-connections of the winding of Figs. 1 and 2.

In Figs. 1 to 3 a winding having three phases I, II, III is housed in six slots of a laminated magnetic field structure having one slot per pole and per phase, numbered from 1 to 6 in the drawing, the conductors or legs of phase I being inserted in known manner in the slots 1 and 4, those of phase II in slots 3 and 6 and those of phase III in slots 2 and 5. For reasons of clarity in the description and the drawings, the reference number for the legs or conductors of phase I will hereinafter be provided with a single prime mark, those for the conductors of phase II with two prime marks and those for the conductors of phase III with three prime marks. Each slot comprises two layers 20, 22, each housing a group of conductors 24 or 26, 28 or 30 of the same phase and the same direction. The cross-connections between the legs of groups 24 and 28, and between the legs of groups 26 and 30 is illustrated in Figs. 2 and 3 and it should be noted that the crossing or interlacing is effected between legs which are in the same layer. The active legs 24' of phase I which are housed in layer 20 of the slot 1 are associated with the active legs 28' housed in layer 20 of slot 4 and the connection between the associated legs 24' and 28' is effected by coil ends or cross conductors 32' which intersect the coil ends 32'' and 32''' of the legs 24'' and 28'', 24''' and 28''' of phases II and III which are all also housed in the layer 20 of the slots 3, 6 and 2, 5 respectively. The length of the coil ends 32 is thereby reduced and their interlacing as shown in Fig. 3 provides a compact interspersing of the respective phases.

The legs 26, 30 of layer 22 are arranged in a manner identical to that of the legs 24, 28 of layer 20 but below the latter.

It should be noted that each pole is surrounded by two coils per phase, which coils are positioned in two layers 20, 22, but in the same slots, all of the coils having the same pitch whereby these coils may be prefabricated on a template or former and easily lodged in the slots. This method of winding is particularly simple since it consists of inserting into the slots all of the coils of one layer, 20 or 22, by slightly bending the coil ends 32 to effect interlacing thereof, the bend being slight since the thickness of the coil wire is itself slight. After the winding of all the phases of the lower layer 22 the winding of the upper layer 20 is effected in identically the same manner as that of the first layer.

It is easy to see that any number of layers can be superimposed so as to provide a suitable conductive cross section which supplies the desired magnetic induction field. In the example shown in the drawing the coil slots and the intervening stator shoulders are of the same width but it is to be noted that the size of the coil ends permits a decrease in the width of said shoulders.

Figure 4:
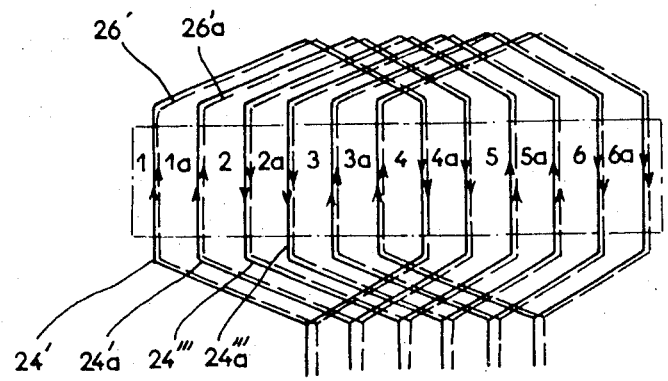
FIG. 4 is a view similar to Fig. 1 of another embodiment in accordance with the invention having two slots per pole and per phase.
Figure 5:
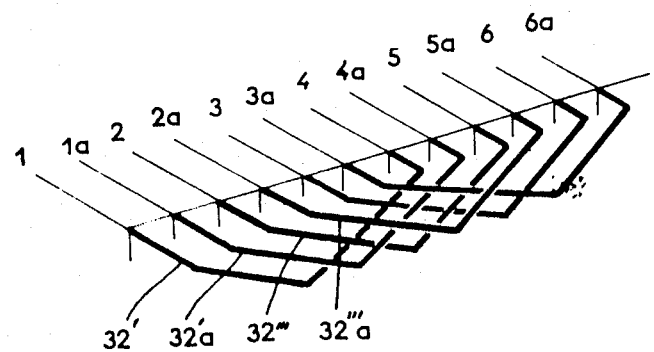
FIG. 5 is a schematic view similar to Fig. 3 of the winding of Fig. 4.

The invention is also applicable to windings having several slots per pole and per phase, and by way of example a variant of the invention with two slots per pole and per phase has been shown in FIGS. 4 and 5. For reasons of clarity the same reference numbers have been used to designate similar or identical parts in the respective figures, a suffix "a" being used to designate elements which are duplicates. Each group 24, 26, 28, 30 is composed of two identical coils 24, 24a; 26, 26a; 28, 28a; 30, 30a, the legs of which are housed in two adjacent slots 1, 1a; 4, 4a for phase I. The same is true of the two other phases. The operation of the motor is of course in no way affected by this subdivision, the interlacing of the coil ends being even more intimate than in the case of Figs. 1–3.

It is noted that each magnetic field section of a length corresponding to a double-pole pitch constitutes a unit which is electrically and magnetically independent from the adjacent sections, the slots of which are all uniformly filled. The winding of the invention therefore lends itself particularly well to the production of unitary magnetic field structures, a plurality of which can be associated either contiguously or not to constitute motors of a desired dimension and power.

In normal operation the groups 24, 26 housed in respective layers of the same slot have a current flowing therethrough of the same phase and the same direction at a given moment.

Figure 6:
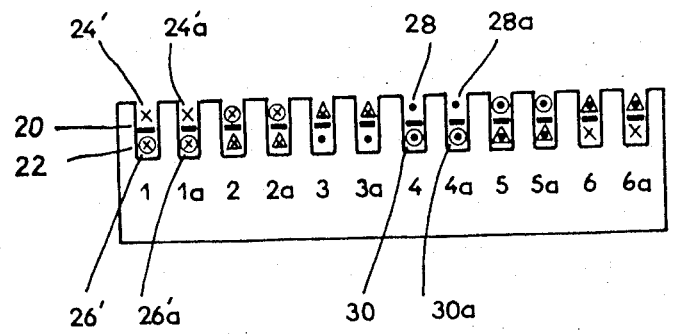
FIG. 6 is a winding diagram for an embodiment according to Fig. 4, but illustrating a different cross-connecting arrangement of the coils thereby producing a different pole pitch than the arrangement of Fig. 4.

The ends of the coils can be made accessible in order to modify the connections and change the effective pole pitch of the inductor assembly. Fig. 6 shows by way of example a manner of connecting the magnetic field structure of Fig. 4, the current directions being indicated by x and by . for current entering into the plane of the figure, or emerging from said plane, respectively, and the different phases being differentiated by symbols such as circles or triangles. It is to be noted that the winding in layer 22 is electrically staggered by two slots, with respect to the winding in layer 20 with the result that in one and the same slot, for instance in slot 1 there flows at a given moment a current of phase I in the winding in layer 20 and a current of the same direction of phase II in the winding 22. The result is an apparent change in the pole pitch of the field or more precisely an improvement in the sinusoidal character of the distribution of the flux.

Other winding combinations, which are more numerous the larger the number of layers, can of course be effected and use may be made of windings with different pole pitches in order to modify the speed of translation of the traveling field. This arrangement is particularly advantageous for the driving of conveyor trucks the speed of which is to be variable along the path.

Figures 7 and 8 illustrate an elongated field structure assembly 110 which is subdivided longitudinally into field structure sections or units 112, 114, 116 which are held together for instance by angle irons 118, 120 which extend along the entire length of the structure 110 and to which the units 112, 114, 116 are conveniently fastened, such as to a flange 119 of the angle iron. The units 112, 114, 116 are spaced apart along the angle irons 118, 120, leaving between each pair of units a space 122, 124 respectively, in which there are housed the guide rollers 126, 128. The rollers 126, 128 which are placed between the successive units 112, 114, 116 are mounted for free rotation on axes 129 which extend transversely to the longitudinal extent of structure 110, said rollers protruding slightly above the upperedge surface of the angle irons 118, 120.

Each field structure unit 112, 114, 116 has slots 130 in which windings 132 are housed in two layers in the manner described heretofore. The said windings produce in a known manner a magnetic field which travels along the longitudinal direction of the unit 110. In the embodiment illustrated in Fig. 7 the slots 130 extend through the flanges 119 of the angle irons 118, 120 and the coil ends are located on the outer sides of the angle irons 118, 120. The number of field structure units can of course be varied and at the longitudinal ends of the field structure 110 there are also provided guide rollers 134, 136, similar to the rollers 126, 128.

An armature 138 of plate shape consisting of conductive material is overlyingly supported relative to the field structure 110 by rollers 126, 128, 134, 136 which assure a space or airgap 140 between said armature 138 and the units 112, 114, 116. The plate 138 is capable of translational displacement along the structure 110 by rolling on the rollers 126, 128, 134, 136, the plate length being sufficient whereby the plate is always supported by at least two of the rollers. Lateral guiding of the armature 138 is effected mechanically, pneumatically or electromagnetically in an appropriate known manner which needs not to be further described or shown in the drawings.

The operation of this device is as follows:

The windings 132 of the units 112, 114, 116 are fed by polyphase currents, thereby producing a traveling magnetic induction field whereby the armature 138 is subjected to Laplace forces and it moves along the longitudinal direction of the structure 110 on the track formed by the successive rollers 134, 126, 128, 136, or vice versa. It is easy to see that as the rollers 126, 128 are positioned between the angle irons 118, 120, the width of the armature 138 may be the minimum which is compatible with the proper operation of the motor, that is to say, a width close to that of the field units 112, 114, 116. In the case of an armature plate 138 of ferromagnetic material, which augments the magnitude of the forces of attraction between the structure 110 and the armature 138, the arrangement of the rollers 126, 128 in the very center of the inductor in the vicinity at which such forces are produced, reduces to a minimum the bending stresses which act on the armature.

It should also be noted that the unitary construction of field structure and guide rollers constitutes a compact monoblock assembly of great rigidity which permits the airgap to be very small.

The invention can be applied with the same accruing benefits to either a horizontal (Fig. 8) or a vertical motor (Fig. 9) and to either a movable or a stationary field structure FIGS. 9 and 10 show another embodiment of the invention comprising either a movable or a stationary field structure straddling a rail-shaped armature with which the guide rollers of the field structure cooperate. In Figs. 9 to 11 the same reference numbers have been used to designate parts identical or similar to those of Figs. 7 and 8.

In Figs. 9 and 10 two field structures 110, 110', each comprising a plurality of field units 112, 114, 116 and guide rollers 126, 128, 134, 136 analogous to those described heretofore, are arranged in mutually facing relationship on opposite sides of an armature plate 138. The two structures 110, 110' are rigidly connected, for instance by the frame 142 of the driven vehicle, shown schematically in Fig. 9.

It will be understood that the rollers 126, 128, 134, 136 provide lateral guiding of the field structure 110, 110', relative to the armature 138 which serves as a rail, whereby the respective elements are positioned with precision relative to each other whatever may be the forces between the two. Vertical guiding is obtained in any known manner which does not form part of the invention and will therefore not be described.

The motor of Figs. 9 and 10 operates in a manner identical to that described above and it has the same advantages of strength, compactness, high power per unit of weight, etc. It is obvious that either the armature or the field structure may be stationary.

The unitary field structure of the invention is particularly suitable for the production of an articulated assembly capable of moving along a curved path. Fig. 11 shows such an assembly in which the successive field units 112, 114, 116 and 112', 114', 116' of each field structure 110, 110', are on opposite sides of the inductor 138 and are articulated to each other about axes 129 of the guide rollers 126, 128 by means of fastening lugs 144. The position of each unit, for instance of the unit 114, is perfectly defined with respect to the armature 138 by the adjacent guide rollers 126, 128 as heretofore described, each unit being capable of pivoting with respect to the adjacent unit so as to constitute a field structure of generally curved shape which adapts itself to the curved parth of the armature rail 138. This flexibility of the field structure is of particular interest for field structures of great length, for instance trains of vehicles moving over a meandering path. In the case of a pair of field structures 110, 110' located on opposite sides of an armature in accordance with Fig. 11, it may be necessary to compensate for the different radii of curvature of the armature 110, 110' by, for example, providing elongated slots in lugs 144 whereby the articulation axis 129 may be displaced along the length of said slots while the field structures are traveling along a curved extent of rail 138.

Various details presented herein relative to particular embodiments of realization, are illustrative and not limitative of the applicability of the herein disclosed inventive concept, it being understood that such details may be varied without departing from the spirit or scope of the disclosed inventive concept.

What is claimed is:

1. A linear induction motor, comprising: at least one electrically and magnetically independent double-pole pitch magnetic field unit, said unit having a longitudinally extending pole surface including a plurality of regularly spaced-apart parallelly extending transversal winding slots; a multilayer winding comprising a plurality of coils; each said coil having a pair of coil sides extending in different slots in the same layer and electrically series connected by cross-conducting means; all slots, including the end slots of said pole surface, carrying the same number of coil sides; the cross-conducting means; all coil sides accommodated in a given slot extending to the same side of said given slot whereby the coils associated with each layer produce, when polyphase energized, a magnetic field traveling linearly along said pole surface longitudinally thereof.

2. A linear induction motor as defined in claim 13, further comprising: A plurality of longitudinally spaced-apart double-pole pitch magnetic field units having colinearly aligned pole faces; further comprising armature support means positioned in the spaces between said units; an elongated armature supported upon said support means; an airgap between said pole faces and a confronting coextensive portion of said armature; said support means and said units forming a unitary assembly, said armature being longitudinally movable with respect to said assembly.

3. A linear induction motor according to claim 14 further comprising means pivotally connecting said units, said armature having a curvilinear portion.

4. A linear induction motor according to claim 14, wherein two of said unitary assemblies are disposed in surface-to-surface facing relationship to each other with said armature disposed therebetween.

* * * * *